(12) United States Patent
Johnston

(10) Patent No.: US 12,337,998 B2
(45) Date of Patent: Jun. 24, 2025

(54) AIRCRAFT GANTRY SYSTEM

(71) Applicant: Daniel Johnston, Redington Beach, FL (US)

(72) Inventor: Daniel Johnston, Redington Beach, FL (US)

(*) Notice: Subject to any disclaimer, the term of this patent is extended or adjusted under 35 U.S.C. 154(b) by 127 days.

(21) Appl. No.: 16/797,758

(22) Filed: Feb. 21, 2020

(65) Prior Publication Data
US 2021/0261273 A1 Aug. 26, 2021

(51) Int. Cl.
*B64F 5/40* (2017.01)
*B64F 5/60* (2017.01)
*B66F 11/04* (2006.01)
*E04G 3/28* (2006.01)

(52) U.S. Cl.
CPC ............. *B64F 5/40* (2017.01); *B64F 5/60* (2017.01); *B66F 11/04* (2013.01); *E04G 3/28* (2013.01)

(58) Field of Classification Search
CPC ..... B64F 5/40; B64F 5/60; E04G 3/28; E04G 3/243; E04G 2003/286; B66F 11/00; B66F 11/04
See application file for complete search history.

(56) References Cited

U.S. PATENT DOCUMENTS

| | | | | |
|---|---|---|---|---|
| 2,337,674 A | * | 12/1943 | Miller | B63C 5/02 182/132 |
| 2,828,166 A | * | 3/1958 | Herring | B64F 5/50 182/115 |
| 3,256,955 A | * | 6/1966 | Khachatoo | B64F 5/40 182/180.1 |
| 3,460,177 A | * | 8/1969 | Rhinehart | B08B 1/00 244/114 R |
| 3,524,207 A | | 8/1970 | Giarretto | |
| 3,831,709 A | * | 8/1974 | Stanford | B64F 5/60 180/125 |
| 4,235,305 A | | 11/1980 | Nygren | |
| 4,821,845 A | * | 4/1989 | DeViaris | B66B 7/021 187/245 |

(Continued)

FOREIGN PATENT DOCUMENTS

| | | |
|---|---|---|
| BR | 102018009536-6 A2 | 1/2019 |
| CN | 103063390 A | 4/2013 |

(Continued)

OTHER PUBLICATIONS

International Search Report and Written Opinion of the International Searching Authority in PCT/US2021/018115, dated Jun. 25, 2021, 11 pages.

(Continued)

*Primary Examiner* — Colleen M Chavchavadze
(74) *Attorney, Agent, or Firm* — Lempia Summerfield Katz LLC

(57) ABSTRACT

A gantry for servicing an aircraft is configured to be positioned adjacent an aircraft to provide access to a perimeter of the aircraft. A platform is moveably attached to the gantry and operable to move along the gantry between a lowered position and a raised position. The gantry is moveable along a floor track system to be positioned adjacent the aircraft. The gantry and floor track system are customizable to different aircraft types and body styles.

18 Claims, 9 Drawing Sheets

(56) References Cited

U.S. PATENT DOCUMENTS

| | | | | | |
|---|---|---|---|---|---|
| 5,152,370 | A | * | 10/1992 | Silberman | B64F 5/60 182/136 |
| 5,165,504 | A | * | 11/1992 | Lecorre | B66F 11/04 414/592 |
| 5,248,341 | A | | 9/1993 | Berry, Jr. et al. | |
| 5,363,940 | A | * | 11/1994 | Fahrion | B64F 5/10 182/115 |
| 5,375,283 | A | * | 12/1994 | Silberman | B64F 5/60 182/130 |
| 5,423,396 | A | * | 6/1995 | Fahrion | B64F 5/10 182/115 |
| 5,685,392 | A | * | 11/1997 | Phillips | B66F 11/04 182/19 |
| 5,701,704 | A | | 12/1997 | Landes | |
| 5,992,565 | A | * | 11/1999 | Lingen | B66B 9/16 182/141 |
| 6,782,665 | B2 | * | 8/2004 | Fahrion | B64F 5/40 182/36 |
| 7,191,873 | B2 | * | 3/2007 | Korchagin | B66B 9/16 182/147 |
| 8,261,879 | B2 | * | 9/2012 | Yang | E04G 3/24 187/244 |
| 9,579,679 | B2 | | 2/2017 | Mathis | |
| 2004/0115034 | A1 | * | 6/2004 | Arijoki | B64F 1/322 414/495 |
| 2007/0007074 | A1 | * | 1/2007 | Lemburg | F03D 80/50 182/128 |
| 2019/0360219 | A1 | | 11/2019 | O'Keefe | |

FOREIGN PATENT DOCUMENTS

| | | | | |
|---|---|---|---|---|
| CN | 206407871 U | | 8/2017 | |
| CN | 109094815 A | | 12/2018 | |
| DE | 102004010973 | * | 9/2005 | B64F 5/00 |
| EP | 0455371 A2 | | 11/1991 | |
| JP | 2015224029 A | | 12/2015 | |
| WO | 9600166 A1 | | 1/1996 | |

OTHER PUBLICATIONS

International Search Report and Written Opinion of the International Searching Authority in PCT/US2021/021881, dated May 27, 2021, 9 pages.

Extended European Search Report from European Patent Application No. 21772493, dated Feb. 12, 2024, 8 pages.

Extended European Search Report from European Patent Application No. 21757587, dated Apr. 12, 2024, 11 pages.

* cited by examiner

AIRCRAFT GANTRY SYSTEM

FIELD

The following disclosure relates to a gantry system for servicing an aircraft.

BACKGROUND

In the aircraft maintenance, repair and overhaul (MRO) industry, such as the aircraft painting business, explosion-proof equipment such as boom and scissor lifts are used to prepare and service, such as paint, new and used aircraft. However, booms and scissor lifts may cause damage to aircrafts being serviced. Collisions of the booms or lifts with the aircraft result in undesired damage, costs, and delay.

Roof-mounted systems have been attempted to reduce the risk of damage. However, the roof-mounted systems are overly expensive.

SUMMARY

By way of introduction, the preferred embodiments described below include apparatuses, systems, and methods for an aircraft gantry system for servicing an aircraft. A floor mounted gantry includes one or more rails shaped to conform to an outer surface of the aircraft. A work platform moves along the one or more rails to provide access to the aircraft for MRO while reducing risk of damage.

In a first aspect, an apparatus for servicing an aircraft is provided. The apparatus includes a rail and an operator platform. The rail has a first end, a second end, a first part adjacent to the first end, and a second part adjacent to the second end and being arcuate. The second part of the rail corresponds to a shape of a perimeter of the aircraft. The operator platform is moveably attached to the rail and operable to translate along the first part and second part of the rail between a lowered position and a raised position. The operator platform provides an operator access to different positions along the perimeter of the aircraft.

In a second aspect, an aircraft gantry system is provided. The aircraft gantry system includes a plurality of gantries, a platform, and a plurality of floor tracks. The plurality of gantries are configured to span around a perimeter of an aircraft. The platform is moveably attached to at least one gantry of the plurality of gantries. The platform is moveable between a lowered position and a raised position along the at least one gantry, such that the platform provides access to the perimeter of the aircraft. The plurality of gantries are configured to move along the plurality of floor tracks to be spaced away from and to be positioned adjacent to the aircraft.

In a third aspect, a method of setting up an aircraft gantry is provided. The method includes positioning the aircraft gantry adjacent an aircraft. A portion of the aircraft gantry is shaped as a perimeter of the aircraft. The aircraft gantry includes a platform moveably attached to the aircraft gantry. The platform is moveable between a lowered position and a raised position along at least the portion of the aircraft gantry, such that the platform provides access to the perimeter of the aircraft. The method also includes locking the aircraft gantry in place once positioned. The method also includes powering the positioning of the aircraft gantry, the movement of the platform along the aircraft gantry, or the positioning of the aircraft gantry and the movement of the platform along the aircraft gantry with one or more explosion proof power sources.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figure 1:
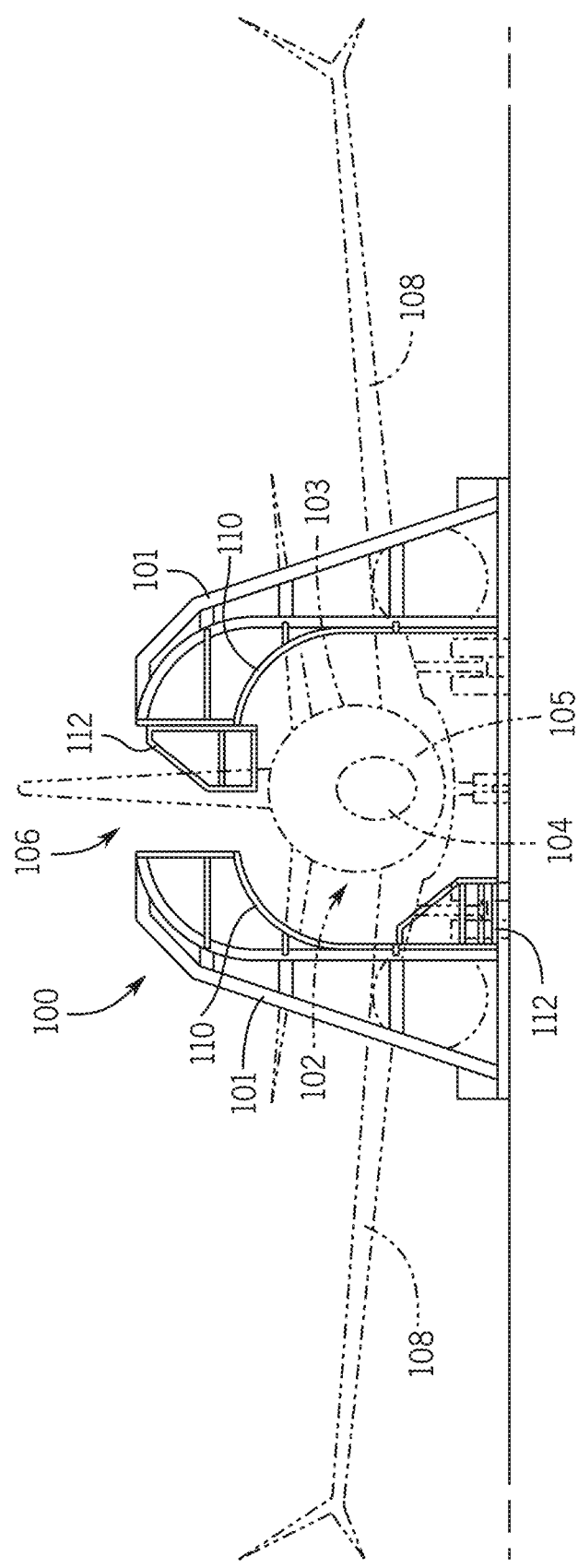
FIG. 1 is a front elevation view of an exemplary aircraft gantry.

The present embodiments generally relate to a floor-operated, moveable gantry system for aircraft maintenance, repair and overhaul (MRO). In order for personnel to perform MRO activities, such as painting an aircraft, personnel often need to work in close proximity to the aircraft and often need access to the entire surface area of the aircraft. Typically, boom and scissor lifts are used in the aircraft MRO industry, but such lifts are prone to equipment failure. Due to the need for close proximity between equipment and the aircraft being serviced to perform MRO activities and the high risk of operator error, conventional boom and scissor lifts may also potentially result in damage to the aircraft being serviced due to collision.

Roof and/or ceiling mounted systems are expensive to install and have other shortcomings. For example, in some ceiling mounted systems, workers may have to attach themselves to a cable or rope support system attached to the ceiling in order to have access to the top surface of an aircraft. This can be dangerous for the workers and may also limit the mobility of the workers, since the workers may need to detach and re-attach from the ceiling mounted system in order to move along the length of the aircraft.

The disclosed embodiments eliminate the use of boom lifts, scissor lifts, and roof/ceiling mounted systems and reduce the problems associated therewith. The disclosed embodiments facilitate coordinated movement for personnel allowing synchronized linear servicing, such as painting, thus providing better production efficiency and higher quality results. The disclosed embodiments also greatly improve the safety of personnel performing MRO activities on aircrafts and reduce risk of collision.

The proposed structure of the disclosed embodiments is designed to be moveable and to surround an aircraft, thereby providing total or major perimeter surface access. The proposed design allows personnel to perform a series of aircraft maintenance services, such as painting, inspections and repairs. The characteristics of the proposed design are customizable to various aircraft body styles and sizes. The floor mounted gantry system is a simple alternative to using boom and scissor lifts. The disclosed aircraft gantry and aircraft gantry system are designed to improve operator safety and job efficiency.

The drawings are not necessarily to scale. Thus, the proportions of the disclosed aircraft gantry and the relative positions of the various features and elements of the aircraft gantry and aircraft gantry system can vary from the examples shown and described herein. The use of terms herein, such as "top," "bottom," "left," "right," "upper," "lower," "lowered," "raised," "inner," "outer," "first," "second," and the like are meant only to differentiate among elements having similar names or different positions. Such terms are not intended to limit the scope of such elements to a particular order, side, height, orientation, position, or the like, except where expressly and specifically stated.

The terms forward, rearward, front, rear, side, top, bottom, underside, and the like are used herein merely for reference and are not intended to limit in any way the specific position or particular orientation of any components of the aircraft gantry. Similarly, aviation terminology, such as aircraft, nose, fuselage, wing, and tail, is used herein merely for reference and is not intended to limit in any way the specific position or particular orientation of any components of the aircraft gantry.

It is to be understood that elements and features of the various representative embodiments described below may be combined in different ways to produce new embodiments that likewise fall within the scope of the present teachings.

Turning now to the drawings, FIGS. 1-8 illustrate various aspects of an exemplary gantry 100 for servicing an aircraft 102. The aircraft 102 may be an airplane 102 and generally includes a nose 104, a fuselage 105, a tail 106, and two wings 108. While an airplane 102 is shown in the Figures, the disclosed gantry 100 may be configured for performing MRO activities on any type of similarly shaped aircraft or vessel. For example, the exemplary gantry 100 may be used to service a submarine, since a submarine has a hull shaped like a fuselage of an aircraft and a nose and tail also similar to an aircraft.

FIG. 1 is a front elevation view of an exemplary aircraft gantry. As shown in FIG. 1, the gantry 100 generally includes a framework structure 101 that supports one or more rails 110 and one or more platforms 112. The framework structure 101 may be shaped to correspond to, or accommodate, the shape of the fuselage 105 of the aircraft 102. The framework structure 101 of the gantry 100 is generally a rigid frame system, such as a scaffolding type of structure, as will be discussed in more detail below. However, other types of structures are possible to support the rail 110 and platform 112. For example, the framework structure 101 of the gantry 100 may be a single piece of material that is rigid and strong enough to support the rail 110 and platform 112. In another example, the framework structure 101 of the gantry 100 may be a cantilever. The framework structure 101 may be moveable. For example, the framework structure 101 may include wheels designed to correspond to, operate in, or use a track system, such that the framework structure 101 is moveable along the track system, as will be discussed below with regard to FIG. 3.

The rail 110 may be attached or secured to the framework structure 101, as will be discussed below with reference to FIG. 2. The platform 112 may be attached to the rail 110 in a way that allows the platform 112 to move or translate along the length of the rail 110, as will be discussed below with reference to FIG. 2. The platform 112 is designed to accommodate an operator (not shown) to perform service on the aircraft 102. As used herein, operator may mean any type of personnel or worker who uses the platform 112. In some embodiments, there may be a plurality of rails 110 attached or secured to the framework structure 101, such that the platform 112 is supported by, and moveable along, the plurality of rails 110. In alternatives, a robotic system uses the platform 112 instead of a person.

FIG. 1 shows two gantries 100, one on the left side of the aircraft 102 and one on the right side of the aircraft 102. As shown in the example of FIG. 1, the two gantries 100 may be identical in form to one another, but with the structure reversed (i.e., mirror images of each other). In this regard, the two gantries 100 shown in FIG. 1 at least partially surround a section of the aircraft 102. Positioning the gantries 100 in this manner provides surface access to the entire perimeter 103 of the fuselage 105 of the aircraft 102 about the section (part along the longitudinal axis of the aircraft 102).

Figure 2:
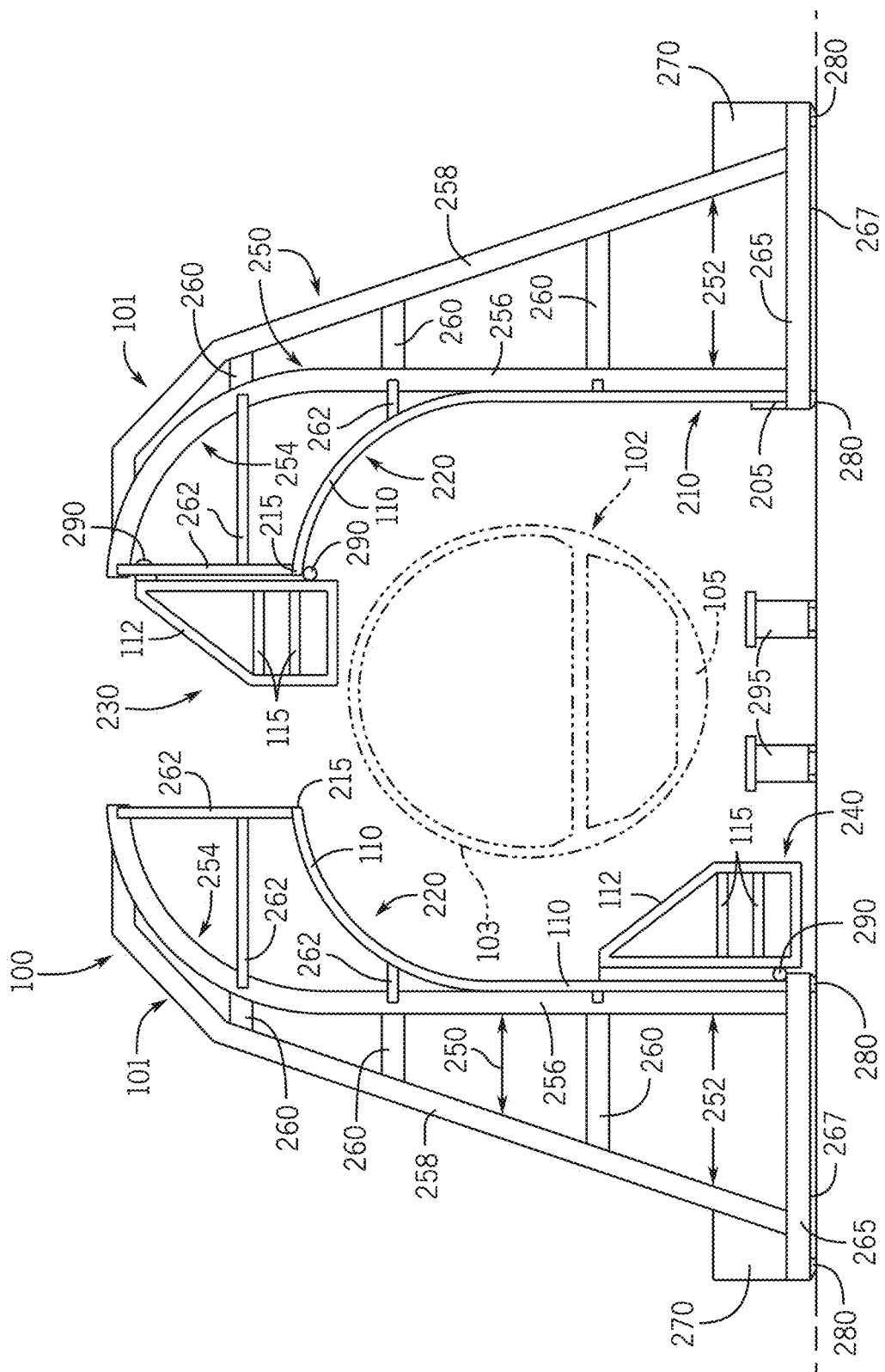
FIG. 2 is cross-section view of the aircraft gantry of FIG. 1.

FIG. 2 shows a cross-section view of the gantry 100 of FIG. 1. The fuselage 105 of the aircraft 102 is shown in cross section. As shown in FIG. 2, the framework structure 101 of the gantry 100 generally includes frame members 250, 260 and a base 265. Some of the frame members may be upright frame members 250 and some of the frame members may be lateral frame members 260, where the lateral frame members 260 connect and support the upright frame members 250. Other configurations are possible. For example, the framework structure 101 of the gantry 100 may include angled frame members as well or instead of lateral frame members 260. Generally, one end or part of an upright frame member 250 is attached to the base 265 and the other end or part is positioned at a height above the fuselage 105 of the aircraft 102.

In one example, a first part 252 of the upright frame members 250 may attach to the base 265 and extend in a substantially vertical or substantially perpendicular direction from the base 265 such that the first part 252 of the upright frame members 250 are substantially perpendicular to the base 265. The upright frame members 250 may include a second part 254 that is curved or arcuate in shape. The curvature of the second part 254 of the upright frame members 250 may correspond to the general shape of the fuselage 105 of the aircraft 102. In this regard, the shape of the second part 254 generally follows the perimeter 103 of the aircraft 102. A straight or jointed (straight pieces connected together to change direction) may be used. There may be any number of upright frame members 250 along the length of the gantry 100.

In the example shown in FIG. 2, the upright frame members 250 may include an inner upright frame member 256 and an outer upright frame member 258 spaced apart from the inner upright frame member 256. However, any number of upright frame members 250 may be used. The inner upright frame member 256 may be attached or secured to the outer upright frame member 258 by any number of lateral frame members 260. In one example, the first parts 252 of the inner upright frame member 256 and outer upright frame member 258 are secured to the base 265 at a distance spaced apart from each other. In this example, the second parts 254 of the inner upright frame member 256 and outer upright frame member 258 converge and are attached to each other at a common point above the fuselage 105 of the aircraft 102.

There may be any number of pairs of inner upright frame members 256 and outer upright frame members 258 spaced apart along the length of the gantry 100. In one example, the gantry 100 may only have two pairs of inner upright frame members 256 and outer upright frame members 258, where each pair is located at respective ends of the gantry 100. In another example, there may be additional pairs of inner upright frame members 256 and outer upright frame members 258 at regular intervals between the ends of the gantry 100. The respective pairs of inner upright frame members 256 and outer upright frame members 258 may be secured to one another by additional lateral support members 260.

Similar to the upright frame members 250, the rail 110 may include a first end 205, a second end 215, a first part 210 adjacent to the first end 205, and a second part 220 adjacent to the second end 215. The first end 205 of the rail 110 may attach to the base 265 and extend in a substantially vertical direction from the base 265 such that the first part 210 of the rail 110 is substantially perpendicular to the base 265. In one example, the first end 205 of the rail 110 may be secured to the base 265 directly adjacent the first part 252 of the inner upright frame member 256. In another example, the first end 205 of the rail 110 may be positioned near the base 265 and adjacent the first part 252 of the inner upright frame member 256 but attached to the inner upright frame member 256 rather than the base 265.

The second part 220 of the rail 110 may be curved, or arcuate in shape, such that the second part 220 of the rail 110 corresponds to the shape of the perimeter 103 of the aircraft 102 (i.e., the shape of the fuselage 105). The curvature is the same but with a greater radius than the perimeter 103 of the aircraft 102. The curvature may be different so that the second part 220 of the rail 110 has different distances away form the aircraft 102. In yet other embodiments the first part 210 of the rail 110 is also curved, continuing to follow the curvature of the perimeter 103 of the aircraft along at least part of a lower half of the aircraft 102.

The rail 110 may be attached or secured to the framework structure 101 of the gantry 100 in different ways. Securing the rail 110 to the framework structure 101 of the gantry 100 provides support for the rail 110 and platform 112. In one example, the rail 110 may be attached to an upright frame member 250 at different points along the rail 110. In this example, the rail 110 may be shaped similarly to the upright frame member 250, albeit smaller in size. For instance, in the example shown in FIG. 2, the first part 210 and second part 220 of the rail 110 may be attached to the inner upright frame member 256 by a number of rail support members 262. In this example, the first part 210 of the rail 110 is positioned adjacent to the first part 252 of the inner upright frame member 256 and the second part 220 of the rail 110 is spaced apart from the second part 254 of the inner upright frame member 256 due to the smaller size of the rail 110. In this example, a rail support member 262 may span between and connect the second end 215 of the rail 110 to an end of the second part 254 of the inner upright frame member 256.

In other embodiments, the second part 254 of the inner upright frame member 256 and the second part 220 of the rail 110 are the same parts.

As discussed above, there may be a plurality of rails 110 and a plurality of pairs of inner upright frame members 256 and outer upright frame members 258 along the length of the gantry 100. In one example, a respective rail 110 may be attached or secured to each respective inner upright frame member 256 of the plurality of pairs of inner upright frame members 256 and outer upright frame members 258 along the length of the gantry 100. In another example, there may be two respective rails 110 attached to a respective inner upright frame member 256 at respective ends of the gantry 100. In yet another example, there may only be a single rail 110 attached to the framework structure 101 along the length of the gantry 100. The single rail 110 may be attached to any inner upright frame member 256 of the gantry 100, such as at an end of the gantry 100 or in the middle of the gantry 100. The number of rails 110 needed and the placement thereof may depend on the size and weight of the platform 112 that is supported by, and moveable along, the rail(s) 110.

As shown in FIG. 2, an operator platform 112 is moveably attached to the rail 110 and operable to translate along the first part 210 and second part 220 of the rail 110 between a raised position 230 and a lowered position 240, such that the operator platform 112 provides an operator (not shown) access to different positions along the perimeter 103 of the aircraft 102. The operator platform 112 may be designed to allow an operator (i.e., personnel or workers) to safely and efficiently perform MRO activities on the aircraft 102. The operator platform 112 may be an open frame structure having a substantially rectangular outline with a platform or floor that allows the operator to freely walk the length of the platform 112. In this way, the operator platform 112 provides the operator access to the perimeter 103 of the aircraft 102. Guard rails 115 may be provided on the sides of the operator platform 112 to protect the operator. The operator platform 112 may also include rails or hooks for securing the operator to the operator platform 112, such as connection points (not shown) for attaching ropes, cables, or safety harnesses between the operator and the operator platform 112.

The operator platform 112 may be moveably attached to the rail 110 using any type of linear actuator system. For example, a rack and pinion system may be used. In this example, the rail 110 may be a geared rail or track and the operator platform 112 may include gears 290 that engage the geared rail 110 that allows the operator platform 112 to translate along the length of the rail 110. The operator platform 112 may include gears 290 near the bottom of the operator platform 112 that engage the rail 110 and gears 290 near the top of the operator platform 112 that engage another geared track or rail (not shown) along the entire length of an upright frame member 250, such as the inner upright frame member 256. In another example, the gears 290 near the top of the operator platform 112 may be wheels that cooperate with a non-geared rail or track (not shown) along the entire length of an upright frame member 250, such as the inner upright frame member 256.

Other types of linear actuators may be used to move the operator platform 112 along the rail 110 from a lowered position 240 to a raised position 230. In one example, a screw drive system may be used. In another example, a chain or belt drive system may be used. In some embodiments, a wheel and rail system may be used, where the gears 290 of the operator platform 112 may be wheels that are designed to align and interact with the rail 110 along the length of the rail 110.

Movement of the operator platform 112 from a lowered position 240 to a raised position 230, or vice versa, as described above may be controlled by any type of controller (not shown) operating one or more motors. However, due to the possible presence of ignitable concentrations of flammable liquids, gases, or vapors that may exist because of repair or maintenance operations, such as in and around fuel tanks of aircrafts, the motor in the disclosed embodiments is an explosion proof power source. In one example, the explosion proof power source is a pneumatic or air motor. The pneumatic or air motor may include a speed reducer. In another example, the explosion proof power source is a hydraulic power source. In yet another example, explosion proof electric motors may be used. Other types of explosion proof power sources, now known or later developed, may be used as well. In one example, a combination of explosion proof power sources may be used, such as an air over hydraulic system.

As discussed above, the base 265 of the gantry 100 may be secured to the first end 205 of the rail 110. The base 265 of the gantry 100 may include wheels 280 attached to a bottom surface 267 of the base 265, such that the base 265 is moveable. The wheels 280 may be configured to cooperate with and follow a floor track (not shown), such that the base 265 is moveable along the floor track, as will be discussed in more detail below in reference to FIG. 3. The wheels 280 may be heavy wheels designed to support the gantry 100. In some embodiments, some of the floor tracks may be angled with respect to a longitudinal axis of the aircraft 102. In this example, the wheels 280 may be angled to allow the wheels 280 to follow the angled floor tracks while orienting the gantry 100 to be parallel to the aircraft 102. The wheels 280 may have a locking mechanism to prohibit the wheels 280 from moving. Non-wheeled arrangements may be used, such as using gears meshed with gearing of the track or using treads.

The gantry 100 of FIG. 2 may also include a counterweight 270 to counteract the weight of the operator platform 112. In the example shown in FIG. 2, the counterweight 270 is positioned on the base 265. In another example, the counterweight 270 may be attached to an upright frame member 250, such as the outer upright frame member 258. In another example, the counterweight 270 may be built into either the base 265 or an upright frame member 250, such as the outer upright frame member 258. In one example, the counterweight 270 may be adjustable to allow weight to be added or removed, depending on a counterbalance force needed. The counterweight 270 may be any material, such as steel or concrete.

The framework structure 101 and the operator platform 112 may be constructed out of any material, but a material that is lightweight, easy to form, and has a high strength-to-weight ratio is preferable. In one example, the framework structure 101 and the operator platform 112 may be constructed out of aluminum tube material. In another example, magnesium or titanium may be used.

Similar to FIG. 1, FIG. 2 shows two gantries 100, one on the left side of the aircraft 102 and one on the right side of the aircraft 102. As shown in the example of FIG. 2, the two gantries 100 may be identical in form to one another, but with the structure reversed (i.e., mirror images of each other). In this regard, the two gantries 100 shown in FIG. 2 surround the aircraft 102. Positioning the gantries 100 in this manner provides surface access to the entire perimeter 103 of one section of the fuselage 105 of the aircraft 102.

Figure 3:
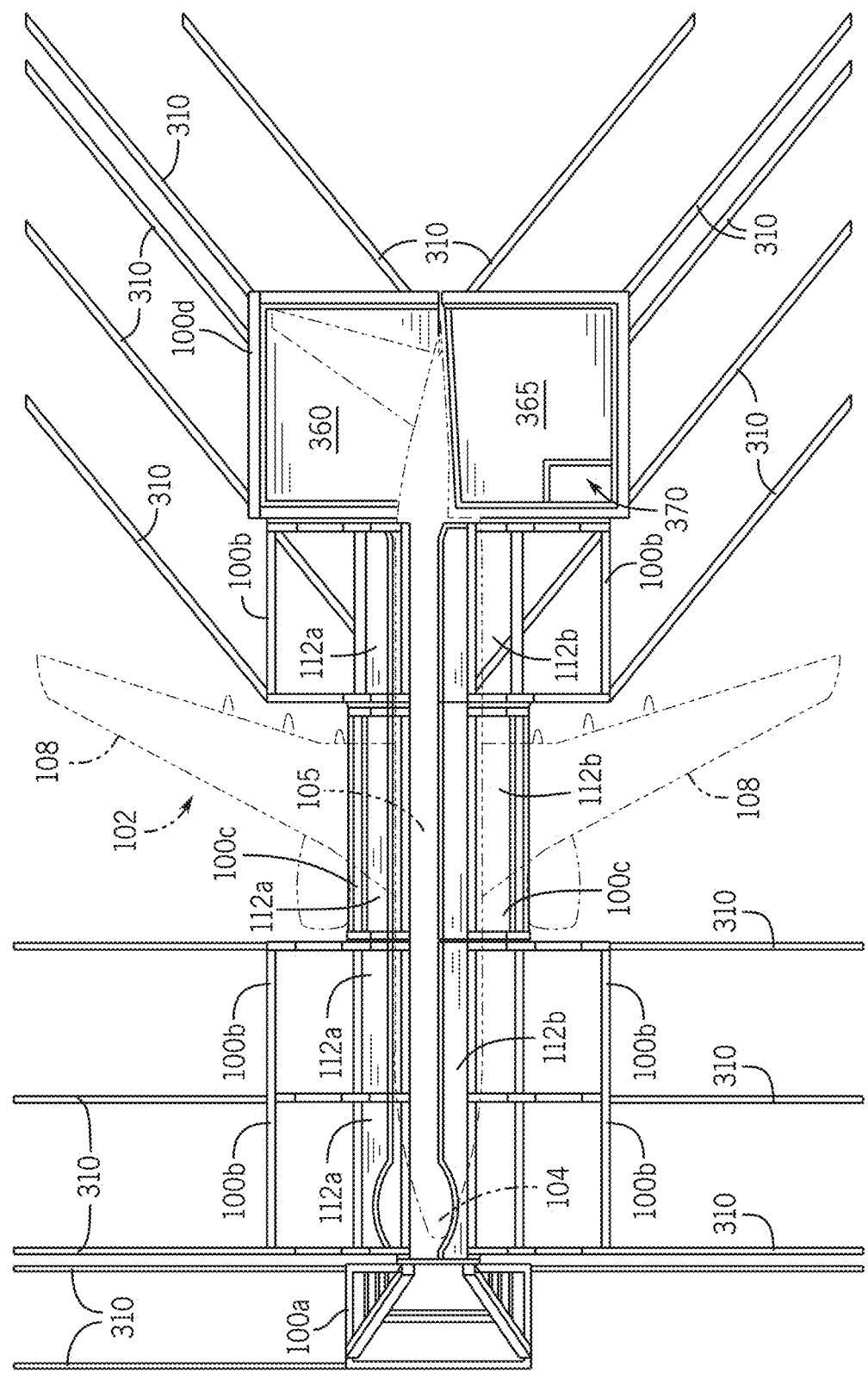
FIG. 3 is a top plan view of an exemplary aircraft gantry system.

FIG. 3 shows a top plan view of an exemplary aircraft gantry system 300. As shown in FIG. 3, the aircraft gantry system 300 includes a plurality of gantries 100a-d configured together to span around a perimeter 103 of an aircraft 102. The plurality of gantries 100a-d may be designed and configured the same as the gantry 100 disclosed above with regard to FIG. 2. Other gantry designs and configurations are possible for different parts of the aircraft 102, as will be discussed below.

The aircraft gantry system 300 also includes a platform 112 moveably attached to at least one gantry 100 of the plurality of gantries 100a-d. The platform 112 may be moveable between a lowered position 112a and a raised position 112b along the at least one gantry 100, such that the platform 112 provides access to the perimeter 103 of the aircraft 102. The platform 112 of the aircraft gantry system 300 may be designed and configured the same as the operator platform 112 disclosed above with regard to FIG. 2. Other platform designs and configurations are possible for different parts of the aircraft 102, as will be discussed below.

The aircraft gantry system 300 also includes a plurality of floor tracks 310. The plurality of gantries 100a-d may be configured to move along the plurality of floor tracks 310 to be spaced away from and to be positioned adjacent to the aircraft 102. In one embodiment, the plurality of gantries 100a-d include wheels (not shown) operable to allow the plurality of gantries 100a-d to move along the plurality of floor tracks 310. In this embodiment, the plurality of floor tracks 310 are adapted to receive the wheels. The wheels of the plurality of gantries 100a-d may be designed and configured the same as the wheels 280 disclosed above with regard to FIG. 2.

In one embodiment, the plurality of floor tracks 310 may be preinstalled in the floor. The floor tracks 310 may be either recessed in the floor or raised above the floor. In another embodiment, the plurality of floor tracks 310 may be installed after the floor has been formed (i.e., as an aftermarket product). In this example, the floor may be retrofitted with the floor tracks 310 installed within (i.e., recessed in) the floor or the floor tracks 310 may be installed on top of the floor. In the latter example, the floor tracks 310 may be raised above the surface of the floor.

The plurality of floor tracks 310 may be custom configured for different types and models of aircraft 102. Since specific aircraft models may have different sizes and configurations, such as wingspan, wing sweep angle, and tail size, different configurations of floor tracks 310 may be used. In this regard, the plurality of floor tracks 310 may be geometrically coordinated to a specific aircraft model or class of models.

In one embodiment, some floor tracks 310 of the plurality of floor tracks 310 are angled with respect to a longitudinal axis of the aircraft 102. The angle of the floor tracks 310 allow gantries 100 to be positioned adjacent the aircraft 102 in a manner to avoid impact with certain parts of the aircraft 102, such as the wings 108. In the example shown in FIG. 3, the floor tracks 310 rearward of the wings 108 of the aircraft 102 are angled. In another embodiment, all floor tracks 310 may be angled. The angled floor tracks 310 may be configured based on the model of the aircraft 102 in order to be geometrically coordinated to the specific aircraft model, as discussed above. The angle at which the floor tracks 310 are angled vary and may depend on the size and configuration of the aircraft 102. For example, the angles of the floor tracks 310 may be between 20 and 60 degrees or between 30 and 50 degrees. In another example, the range of angles can be anywhere from 0 to 90 degrees.

The plurality of floor tracks 310 may include travel stops and locks (not shown) that hold the plurality of gantries 100*a-d* in position. The travel stops and locks may include stops and locking pins at predetermined locations along the tracks 310. The travel stops and locks may be installed at locations along the tracks 310 that allow the plurality of gantries 100*a-d* to be positioned in close proximity to the aircraft 102 while prohibiting the gantries 100*a-d* from contacting the aircraft 102, thus preventing damage to the aircraft 102 caused by impact of the gantries 100*a-d* to the aircraft 102.

In another embodiment, the plurality of floor tracks 310 may also include stops and locks, such as wheel stops, that accurately position and hold the aircraft 102 in place. The plurality of floor tracks 310 may also have indicators to help align the aircraft 102. For example, the indicators of the floor tracks 310 may indicate where to position and align wheel chocks of the landing gear of the aircraft 102.

The aircraft gantry system 300 may include an explosion proof power source (not shown) operable to control movement of the plurality of gantries 100*a-d* along the plurality of floor tracks 310. The explosion proof power source may also be operable to control the movement of the platform 112 along at least one gantry 100 of the plurality of gantries 100*a-d*. As discussed above with regard to FIG. 2, the explosion proof power source may be a pneumatic or air motor and may include a speed reducer. In another example, the explosion proof power source may be a hydraulic power source. In yet another example, explosion proof electric motors may be used. Other types of explosion proof power sources, now known or later developed, may be used as well. Combinations of any of these explosion proof power sources may be used. In one example, an air over hydraulic system may be used. In another example, a different power source may be used for different parts of the system 300. For instance, a pneumatic or air motor may be used to control movement of the plurality of gantries 100*a-d* along the plurality of floor tracks 310 and a hydraulic power source may be used to control the movement of the platform 112 along at least one gantry 100 of the plurality of gantries 100*a-d*. In one example, some gantries 100 of the plurality of gantries 100*a-d* may be moved manually without the need of an explosion proof power source.

As indicated above, some gantries 100 of the plurality of gantries 100*a-d* may be designed and configured differently for different portions of the aircraft 102. In one embodiment, the aircraft gantry system 300 includes a nose gantry 100*a*, at least two fuselage gantries 100*b*, a wing gantry 100*c*, and a tail gantry 100*d*. In this embodiment, the nose gantry 100*a*, the at least two fuselage gantries 100*b*, the wing gantry 100*c*, and the tail gantry 100*d* may be coupled together, such as using releasable latches or bolts. The different gantry sections 100*a-d* may also be locked together, such as with alignment pins and cam locks. In one example, each of the nose gantry 100*a*, the at least two fuselage gantries 100*b*, the wing gantry 100*c*, and the tail gantry 100*d* may have a respective built in platform 112. The built-in platform 112 may be designed and configured the same as the operator platform 112 disclosed above with regard to FIG. 2. When the plurality of gantries 100*a-d* are coupled and/or locked together and the respective platforms 112 are aligned (i.e., the respective platforms 112 are in the same position along their respective gantries 100*a-d*), workers are able to pass from one gantry 100 to the adjacent gantry 100, thus enabling workers to walk the entire length of the aircraft 102 along the gantries 100*a-d*. This facilitates coordinated movement of personnel along the aircraft 102, thereby allowing synchronized linear servicing, such as painting. This type of coordinated movement provides better production efficiency and higher quality results.

Figure 4:
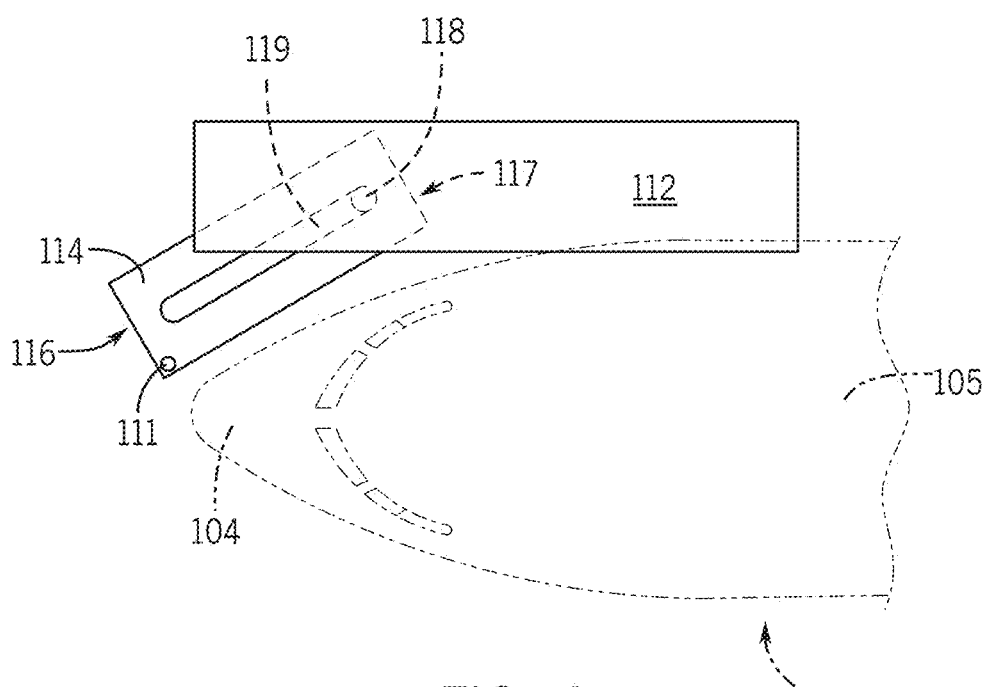
FIG. 4 is a top plan view of an exemplary nose platform.

In another example, the nose gantry 100*a* may not have a built-in platform 112. In this example, a fuselage gantry 100*b* directly adjacent the nose gantry 100*a* may also include a nose platform 114 pivotably and/or slidably attached to the fuselage gantry 100*b*, such as an underneath side of the platform 112 of the fuselage gantry 100*b*. FIG. 4 shows a top plan view of an exemplary nose platform 114. The nose platform 114 may include an attachable end 116 and an attached end 117. The attached end 117 may be pivotably and/or slidably attached to the underside of the platform 112 of the fuselage gantry 100*b*. The pivotable and/or slidable attachment may be any mechanism that allows the nose platform 114 to pivot and/or slide with respect to the platform 112. In one embodiment, the attached end 117 may be pivotably and/or slidably attached to the underside of the platform 112 using a pivot 118 and slot 119. In one example, the pivot 118 and slot 119 act as a pivot and slide hinge or a pin and slot mechanism. The pivot 118 may be a pin or shaft around which the nose platform 114 pivots and/or slides. The slot 119 may be narrow aperture or slit spanning along the longitudinal axis of the nose platform 114 sized to correspond to the pivot 118. Other sizes and placements of the slot 119 are possible. In this regard, the attachable end 116 may be configured to pivot and/or slide with respect to the platform 112 of the fuselage gantry 100*b* by pivoting and/or sliding around the pivot 118.

In this embodiment, the attachable end 116 of the nose platform 114 may also include a connection point 111 and may be configured to engage and cooperate with the nose gantry 100*a*, such as attaching the connection point 111 to a rail 110 of the nose gantry 100*a*. In this embodiment, the nose platform 114 is configured to move between a lowered position and raised position along with the platform 112 of the fuselage gantry 100*b*. In one example, the connection point 111 is located at a point along the attachable end 116 of the nose platform 114 closest to the nose 104 of the aircraft 102 (as shown in FIG. 4). In another example, the connection point 111 may be located at any given point along the attachable end 116 of the nose platform 114.

In one embodiment, the shape of the nose platform 114 may be shaped similarly to the platform 112 of the fuselage gantries 100*b*. In another embodiment, the nose platform 114 may be curved to more closely follow the shape of the nose 104 of the aircraft 102.

Figure 5:
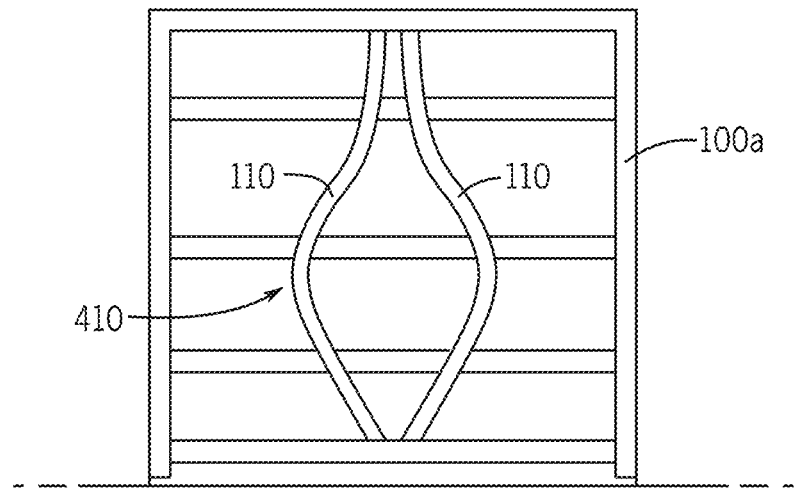
FIG. 5 is a front elevation view of an exemplary nose gantry of the aircraft gantry system of FIG. 3.

FIG. 5 shows a front elevation view of an exemplary nose gantry 100*a* of the aircraft gantry system 300 of FIG. 3. The nose gantry 100*a* of FIG. 5 is designed and configured to receive a nose 104 of an aircraft 102. The nose gantry 100*a* may be custom designed for different aircraft 102 body types. Within the nose gantry 100*a* are two rails 110 or tracks that form an hourglass-shaped guide rail system 410. The hourglass-shaped guide rail system 410 may be configured so that each rail 110 receives and provides direction for a respective attachable end 116 of a respective nose platform 114 of a respective adjacent fuselage gantry 100*b*. In this regard, each nose platform 114 may be moveable between a raised position and a lowered position corresponding to the movement of the platform 112 of the fuselage gantry 100*b* to which the nose platform 114 is pivotably and/or slidably attached. As the nose platform 114 raises or lowers, the nose platform 114 rotates (i.e., pivots) and/or slides relative to the platform 112 of the fuselage gantry 100*b*, positioning the nose platform 114 adjacent to the nose 104 of the aircraft 102 at various heights despite the change in circumference of the nose 104. Other rail 110 configurations are possible.

In another embodiment, the nose gantry 100a may include a built-in platform (not shown) similar to the platforms 112 discussed above with respect to FIG. 2. In this example, the nose gantry 100a may have rails 110 configured to engage the platform and allow the platform to move between a lowered position and raised position.

As shown in FIG. 5, the portion of the rails 110 in the upper and lower portions of the hourglass-shaped guide rail system 410 are spaced closer together than in the middle portion of the hourglass-shaped guide rail system 410. The portions of the rails 110 in the upper and lower portions of the hourglass-shaped guide rail system 410 are positioned toward the front of the nose gantry 100a (i.e., face of the nose gantry 100a shown in FIG. 5), whereas the portions of the rails 110 in the middle portion of the hourglass-shaped guide rail system 410 are angled and positioned towards the middle or back of the nose gantry 100a. Thus, the rails 110 of the hourglass-shaped guide rail system 410 are configured to correspond to the shape of the nose 104 of the aircraft 102. In this regard, the hourglass-shaped guide rail system 410 allows accurate close distance travel of the nose platforms 114 around the nose 104 of the aircraft 102 once the nose 104 of the aircraft 102 is positioned or received into the nose gantry 100a. In this example, the nose platform 114 is moveable between a lowered position and a raised position along a rail 110 of the nose gantry 100a, such that the nose platform 114 provides access to the nose 104 of the aircraft 102. The nose gantry 100a may include set stops and formed roller guides (not shown) that allows the respective nose platforms 114 to follow the shape of the nose 104 of the aircraft 102.

The aircraft gantry system 300 may include fuselage gantries 100b. The fuselage gantries 100b of the aircraft gantry system 300 of FIG. 3 may be designed and configured the same as the gantry 100 disclosed above with regard to FIG. 2. There may be any number of fuselage gantries 100b as part of the gantry system 300. In one embodiment, there are at least two fuselage gantries 100b in the gantry system 300. In another embodiment, there are at least six fuselage gantries 100b in the gantry system 300. For example, there are a total of six fuselage gantries 100b shown in FIG. 3, with three fuselage gantries 100b on each side of the aircraft 102. In the example shown in FIG. 3, four fuselage gantries 100b span from the nose 104 to the wings 108, two on each side of the aircraft 102, and two fuselage gantries 100b are positioned behind the wings 108 of the aircraft 102 (i.e., between the wings 108 and the tail 106), one on each side of the aircraft 102. In one embodiment, the number of fuselage gantries 100b may depend on the size of the aircraft 102 being serviced. In this example, larger aircrafts 102 may require additional fuselage gantries 100b. In another embodiment, the size of the fuselage gantries 100b may change based on the size of the aircraft 102 being serviced. For example, for larger aircrafts 102, rather than adding additional fuselage gantries 100b, the fuselage gantries 100b may be designed to be longer and thus span longer distances along the fuselage 105 of the aircraft 102.

The aircraft gantry system 300 may include one or more wing gantries 100c with respective platforms 112. Due to the presence of the wings 108, a full gantry 100 may be unable to be positioned alongside the aircraft 102 at the location of the wings 108. Therefore, the wing gantries 100c of the aircraft gantry system 300 of FIG. 3 may be designed and configured the same as the upper portion of the gantry 100 disclosed above with regard to FIG. 2. In this regard, a platform 112 of a wing gantry 100c may move along the wing gantry 100c to provide operator access to a portion of the fuselage 105 from above the wing 108 to the top of the fuselage 105. The wing gantries 100c may be custom designed for each aircraft 102 wing type. As shown in the example of FIG. 3, there may be two wing gantries 100c, one on each side of the aircraft 102 above the respective wings 108 of the aircraft 102. The two wing gantries 100c may be identical in form to one another, but with the structure reversed (i.e., mirror images of each other). In this regard, the two wing gantries 100c surround the upper portion of the aircraft 102 and provide surface access to the top half perimeter 103 of the aircraft 102. In other embodiments, wing gantries 100c may be provided below the wings 108.

Figure 9:
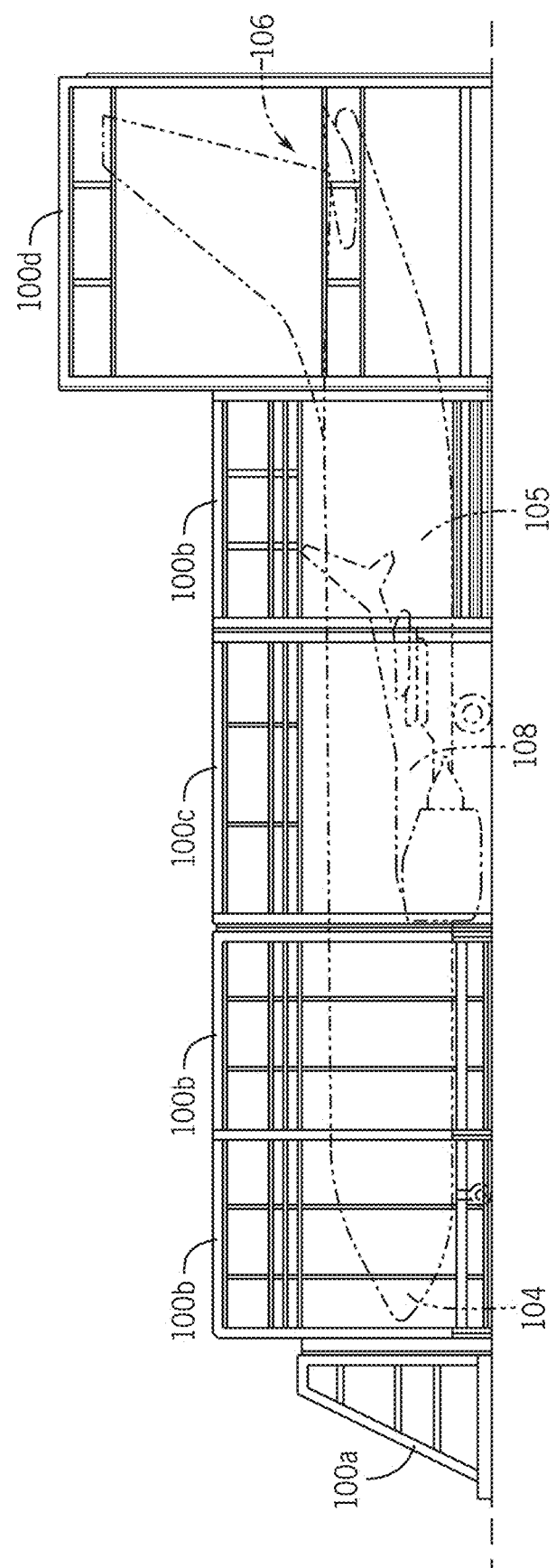
FIG. 9 is another side elevation view of the aircraft gantry system of FIG. 3.

In one embodiment, a wing gantry 100c is removably attached to one of the at least two fuselage gantries 100b, such that the wing gantry 100c is cantilevered over a wing 108 of the aircraft 102, supported by the attached fuselage gantry 100b, as shown in FIG. 9. In one example, the wing gantry 100c may be attached to, and supported by, an adjacent fuselage gantry 100b in front of the wing gantry 100c (i.e., a fuselage gantry 100b between the wing 108 and the nose 104 of the aircraft). In other example, the wing gantry 100c may be attached to, and supported by, an adjacent fuselage gantry 100b behind the wing gantry 100c (i.e., a fuselage gantry 100b between the wing 108 and the tail 106 of the aircraft 102). In another embodiment, the wing gantry 100c may be self-supported. For example, the wing gantry 100c may be supported by braces or support members (not shown) configured to support the wing gantry 100c above the wing 108 of the aircraft 102. In this particular example, the wing gantry 100c may be similar to typical scaffolding.

There may be any number of wing gantries 100c as part of the gantry system 300. In one embodiment, there are at least two wing gantries 100c in the gantry system 300, such as described above and as shown in FIG. 3. In another embodiment, there may be four wing gantries 100c in the gantry system 300. For example, there may be two wing gantries 100c on each side of the aircraft 102. In this example, one wing gantry 100c may be attached to a fuselage gantry 100b in front of the wing 108 in order to span half the distance of the wing 108 (i.e., the front half of the wing 108), and a second wing gantry 100c may be attached to a fuselage gantry 100b rearward of the wing 108 in order to span the other half of the wing 108 (i.e., the back half of the wing 108). In one embodiment, the number of wing gantries 100c may depend on the size of the wings 108 of aircraft 102 being serviced. In this example, larger aircrafts 102 with larger wings 108 may require additional wing gantries 100c. In another embodiment, the size of the wing gantries 100c may change based on the size of the wings 108 of the aircraft 102 being serviced. For example, for larger aircrafts 102, rather than adding additional wing gantries 100c, the wing gantries 100c may be designed to be longer and thus span longer distances along the wings 108 of the aircraft 102.

Figure 6:
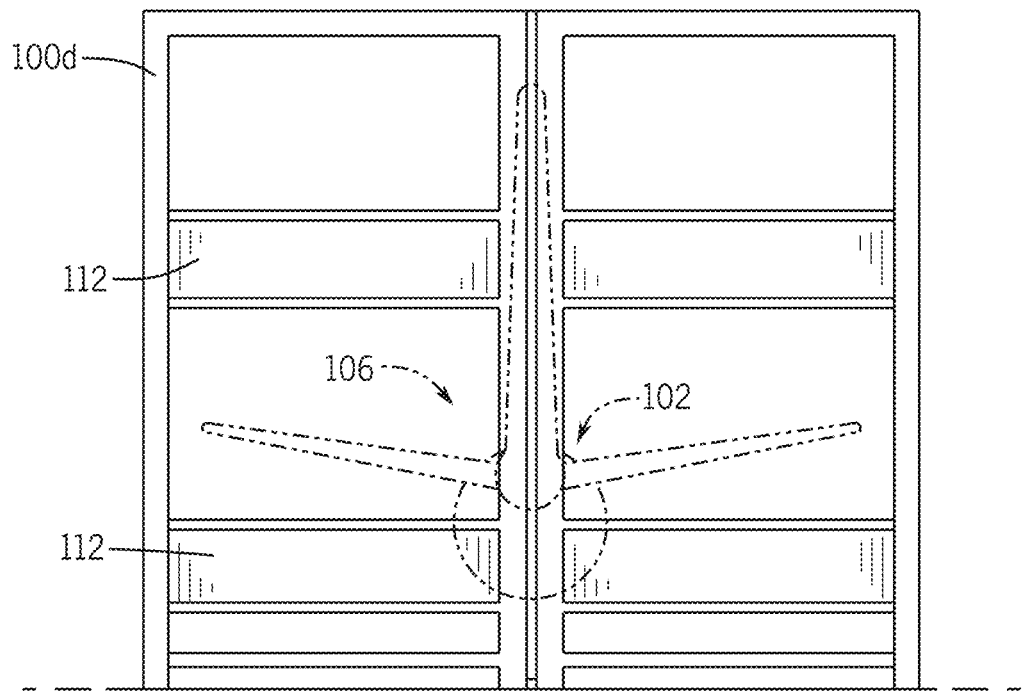
FIG. 6 is a rear elevation view of an exemplary tail gantry of the aircraft gantry system of FIG. 3.

FIG. 6 shows a rear elevation view of an exemplary tail gantry 100d of the aircraft gantry system 300 of FIG. 3. The tail gantry 100d of FIG. 6 is designed and configured to receive a portion of a tail 106 of an aircraft 102. The tail gantry 100d may be custom designed for each aircraft 102 body type. As shown in the example of FIG. 6, there may be two tail gantries 100d, one on each side of the tail 106 of the aircraft 102. The two tail gantries 100d may be identical in form to one another, but with the structure reversed (i.e., mirror images of each other). In this regard, the two tail gantries 100d shown in FIG. 6 surround the tail 106 of the aircraft 102. Positioning the tail gantries 100d in this manner provides surface access to the entire tail 106 of the aircraft 102.

The exemplary tail gantry 100d includes two platforms 112, one in the upper region of the tail gantry 100d and one in the lower region of the tail gantry 100d. Referring back to FIG. 3, the platform 112 in the upper region of the tail gantry 100d is shown as an upper platform 365 and the platform 112 in the lower region of the tail gantry 100d is shown as a lower platform 360. The lower platform 360 is positioned underneath the tail wings whereas the upper platform 365 is positioned above the tail wings. The upper platform 365 may also include an access area 370 for providing personnel access between the lower platform 360 and the upper platform 365. The access area 370 may be an opening in the floor of the upper platform 365 and may include a ladder (not shown) spanning from the upper platform 365 to the lower platform 360. Other means for allowing personnel to move between the upper platform 365 and the lower platform 360 are possible.

The two platforms 112 of the tail gantry 100d may be identical other than their position as either in the upper or lower region of the tail gantry 100d. The two platforms 112 of the tail gantry 100d may be designed and configured the same as the operator platform 112 disclosed above with regard to FIG. 2. The platform 112 in the upper region of the tail gantry 100d (i.e., upper platform 365 of FIG. 3) may be configured to travel along rails (not shown) between a lowered position near the top of the rear wings to a raised position near the top of the tail rudder. The platform 112 in the lower region of the tail gantry 100d (i.e., lower platform 360 of FIG. 3) may be configured to travel along rails between a lowered position near the ground to a raised position near the bottom of the rear wings. In this regard, the two platforms 112 provide access to the entire height of the tail section 106 of the aircraft 102. In one embodiment, the rails of the tail gantry 100d may be curved similar to the rails 110 of the platforms 112 discussed above to follow a curvature of the tail portion of the fuselage 105. In another embodiment, the rails of the tail gantry 100d are substantially vertical and allow the platforms 112 of the tail gantry 100d to move up and down.

Referring back to FIG. 2, the aircraft gantry system 300 may also include one or more ground carts 295 configured to move along the plurality of floor tracks 310 to be positioned underneath the aircraft 102. In this embodiment, the one or more carts 295 provide access to an underside of the aircraft 102. The one or more carts 295 may be padded carts configured for an operator to lay on and may be controlled with a foot pedal (not shown). The one or more carts 295 may be used in conjunction with any gantry 100 of the plurality of gantries 100a-d. The one or more carts 295 may be particularly helpful when used with the wing gantry 100c, since the wing gantry 100c only provides access to a portion of the perimeter 103 of the aircraft 102 above the wing 108. In this regard, the one or more carts 295 provide access to the remainder of the perimeter 103 of the aircraft 102 not accessible by the wing gantry 100c (i.e., the underside of the aircraft 102 between the wings 108).

Figure 7:
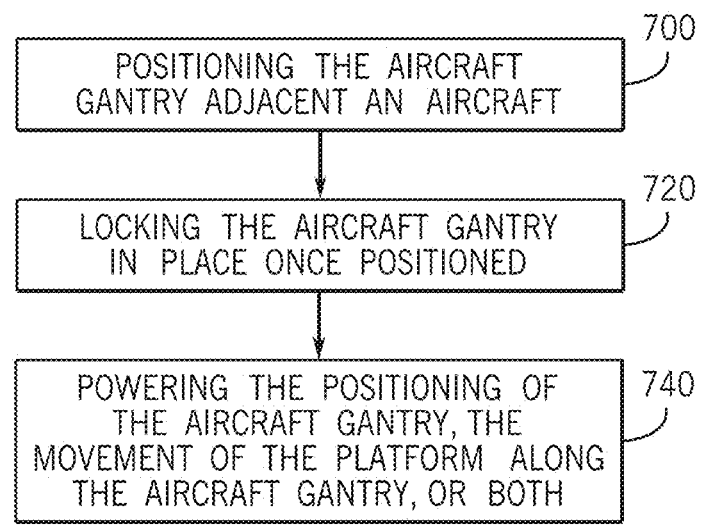
FIG. 7 illustrates a flow chart depicting one embodiment of a method for setting up an aircraft gantry.

FIG. 7 shows a flow chart depicting one embodiment of a method for setting up an aircraft gantry 100. The operation may be implemented using any gantry 100 of the plurality of gantries 100a-d described above. In other embodiments, a different gantry may be used. The method may be implemented in the order shown but may be implemented in or according to any number of different orders. For example, powering the positioning of the aircraft gantry (act 740) may be performed before positioning the aircraft gantry adjacent the aircraft (act 700). Additional, different, or fewer acts may be provided. For example, positioning the aircraft gantry adjacent an aircraft (act 700) may be performed any number of times. As another example, acts 700-740 may be repeated for additional gantries and the additional act of coupling and/or locking the different gantries together may be added.

The method for setting up an aircraft gantry 100 may include positioning the aircraft gantry 100 adjacent an aircraft 102 (act 700). In this example, a portion of the aircraft gantry 100 may be shaped as a perimeter 103 of the aircraft 102, as discussed above. Also as discussed above, the aircraft gantry 100 may include a platform 112 moveably attached to the aircraft gantry 100, the platform 112 being moveable between a lowered position and a raised position along at least the portion of the aircraft gantry 100, such that the platform 112 provides access to the perimeter 103 of the aircraft 102. Positioning the aircraft gantry 100 adjacent the aircraft 102 may include rolling the aircraft gantry 100 into place (i.e., into close proximity to the aircraft 102). In one embodiment, the aircraft gantry 100 may be rolled into place utilizing a preinstalled track system that is geometrically coordinated to the specific aircraft model. For example, positioning the aircraft gantry 100 may include moving the aircraft gantry 100 along a floor track system. In this example, the floor track system includes floor tracks 310 that are angled with respect to a longitudinal axis of the aircraft 102. In one embodiment, blocks or stops may be provided to limit movement of the aircraft gantry 100 and avoid collisions between the aircraft gantry 100 and the aircraft 102 during positioning of the aircraft gantry 100 adjacent the aircraft 102.

The method for setting up an aircraft gantry 100 may also include locking the aircraft gantry 100 in place once positioned (act 720). Locking the aircraft gantry 100 in place may include utilizing locking mechanisms on wheels of the aircraft gantry 100 or locking mechanisms within the floor tracks 310 of the floor track system to keep the aircraft gantry 100 in position. Locking the aircraft gantry 100 in place may also include coupling or locking different adjacent gantry sections together, such as locking two adjacent fuselage gantries 100b together, locking a wing gantry 100c to a fuselage gantry 100b, or locking a nose gantry 100a or tail gantry 100d to an adjacent fuselage gantry 100b.

Figure 8:
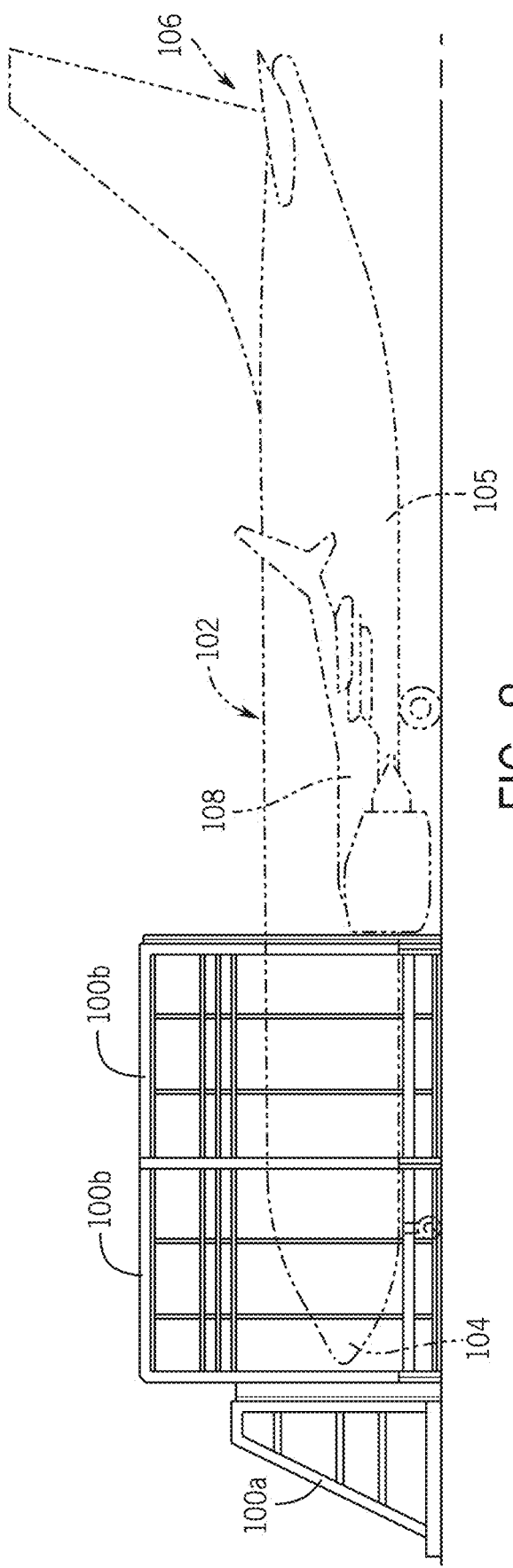
FIG. 8 is a side elevation view of the aircraft gantry system of FIG. 3.

FIG. 8 shows a side elevation view of the aircraft gantry system 300 of FIG. 3 after a nose gantry 100a and fuselage gantries 100b are positioned adjacent the aircraft 102. In one embodiment, the nose gantry 100a and the fuselage gantries 100b are locked into position, as discussed above, as soon as they are positioned in place adjacent the aircraft 102. In another embodiment, the nose gantry 100a and the fuselage gantries 100b are not locked into position until after all gantries 100a-d are placed in their respective position, as will be discussed below with respect to FIG. 9.

FIG. 9 shows another side elevation view of the aircraft gantry system 300 of FIG. 3 after the nose gantry 100a, the fuselage gantries 100b, the wing gantries 100c, and the tail gantries 100d are positioned adjacent the aircraft 102. In one embodiment, the gantries 100a-d are locked into position sequentially as each one is positioned adjacent the aircraft 102. In another embodiment, the gantries 100a-d are locked into position after all gantries 100a-d are positioned adjacent the aircraft 102. As discussed above, locking the gantries 100a-d in place may include engaging locking mechanisms on either the wheels of the gantries 100a-d or the floor track system, or locking the gantries 100a-d together. As discussed above, once the gantries 100a-d are positioned and locked in place, the respective platforms 112 of the respective gantries 100a-d may be similarly positioned to allow personnel to move between the gantries 100a-d along the platforms 112. For example, as shown in FIG. 9, the platforms 112 of at least the fuselage gantries 100b and the wing gantries 100c are aligned at the same level, thus allowing personnel to move between the platforms 112 from the nose 104 of the aircraft 102, over the wings 108, and to where the tail 106 of the aircraft 102 begins.

As shown in the figures, the platforms 112 of the fuselage gantries 100b on the left side of the aircraft 102 (i.e., left side from a perspective in front of the aircraft 102 looking at the nose 104, and the background side of the aircraft 102 from the perspective of the side elevation views of the aircraft 102) are in a lowered position 240, while the platforms 112 of the fuselage gantries 100b on the right side of the aircraft 102 (i.e., right side from a perspective in front of the aircraft 102 looking at the nose 104, and the foreground side of the aircraft 102 from the perspective of the side elevation views of the aircraft 102) are in a raised position 230.

Figure 10:
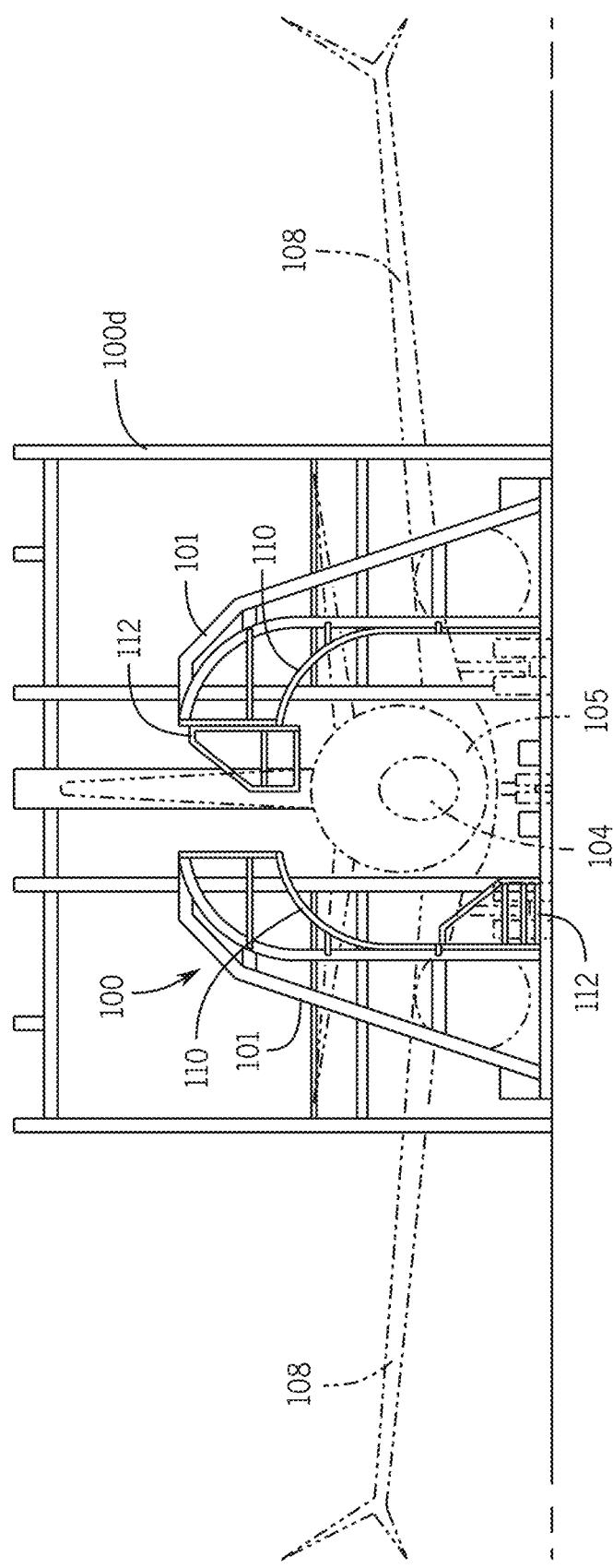
FIG. 10 is a front elevation view of the aircraft gantry system of FIG. 3.

FIG. 10 shows a front elevation view of the aircraft gantry system 300 of FIG. 3 after at least two fuselage gantries 100b and the tail gantry 100d are positioned adjacent the aircraft 102.

Referring back to FIG. 7, the method for setting up an aircraft gantry 100 further includes powering the positioning of the aircraft gantry 100, the movement of the platform 112 along the aircraft gantry 100, and/or the positioning of the aircraft gantry 100 and the movement of the platform 112 along the aircraft gantry 100 with one or more explosion proof power sources (act 740). After the aircraft gantry 100 is sequentially positioned and locked, an air or explosion-proof power source may be provided to control the operator platform 112, allowing the operators to raise and lower multiple personnel around the perimeter 103 of the aircraft 102. Powering the positioning of the aircraft gantry 100 or powering the movement of the platform 112 may include providing an explosion proof power source to control the position of the gantry 100 and/or the movement of the platform 112. The explosion proof power source may be a pneumatic or air motor, a hydraulic power source, or an electric motor. Other types of explosion proof power sources, now known or later developed, may be used as well.

In one example, as discussed above, the aircraft gantry 100 includes a plurality of gantry sections 100a-d and a plurality of respective platforms 112. In this example, the method of setting up the aircraft gantry 100 may also include controlling the plurality of respective platforms 112 independently or synchronously for speed, distance, position, or combinations thereof along at least the portion of the respective aircraft gantry 100a-d. This allows personnel along the length of the aircraft 102 to work in unison on the same portion of the aircraft 102 (i.e., at the same height of the fuselage 105 of the aircraft 102). Independently or synchronously controlling the speed and/or distance of the platforms 112 may be performed using valves of the power source.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:
1. An aircraft gantry system comprising:
a plurality of gantries configured to span around a perimeter of an aircraft, each gantry of the plurality of gantries having a first rail, a second rail on a same side of the gantry as the first rail, and a platform moveably attached to the first rail and the second rail, the platform being moveable between a lowered position and a raised position along the first rail and the second rail in a curved trajectory corresponding to a curvature of the perimeter of the aircraft, such that the platform provides access to the perimeter of the aircraft, wherein the platform is configured to be adjacent to another platform of another gantry of the plurality of gantries to allow personnel to move between adjacent platforms along a length of the aircraft; and
a plurality of floor tracks, wherein the plurality of gantries are configured to move along the plurality of floor tracks to be spaced away from and to be positioned adjacent to the aircraft,
wherein a bottom of the platform is moveably attached to the first rail and a top of the platform is moveably attached to the second rail,
wherein the second rail is positioned at a distance further away from the aircraft than the first rail in both the lowered position and the raised position, and
wherein a floor of the platform extends entirely beyond an end of the first rail in a direction of the first rail and an end of the second rail in a direction of the second rail when the platform is in the raised position.

2. The aircraft gantry system of claim 1, wherein the plurality of gantries comprises:
a nose gantry;
at least two fuselage gantries;
a wing gantry; and
a tail gantry,
wherein the nose gantry, the at least two fuselage gantries, the wing gantry, and the tail gantry are configured to be coupled together.

3. The aircraft gantry system of claim 1, wherein the plurality of gantries further comprises wheels operable to allow the plurality of gantries to move along the plurality of floor tracks,
wherein the plurality of floor tracks are adapted to receive the wheels.

4. The aircraft gantry system of claim 1, further comprising a pneumatic power source operable to control movement of the plurality of gantries along the plurality of floor tracks and movement of the platform along the first rail and the second rail, wherein the pneumatic power source is configured such that the pneumatic power source will not ignite a surrounding flammable liquid, gas, vapor, or combinations thereof.

5. The aircraft gantry system of claim 4, wherein the pneumatic power source comprises a pneumatic motor.

6. The aircraft gantry system of claim 2, wherein the wing gantry is removably attached to one of the at least two fuselage gantries, such that the wing gantry is cantilevered over a wing of the aircraft.

7. The aircraft gantry system of claim 1, wherein some floor tracks of the plurality of floor tracks are angled with respect to a longitudinal axis of the aircraft.

8. The aircraft gantry system of claim 1, further comprising a cart configured to move along the plurality of floor tracks to be positioned underneath the aircraft, such that the cart provides access to an underside of the aircraft.

9. The aircraft gantry system of claim 2, wherein the nose gantry includes a rail configured to correspond to a shape of a nose of the aircraft, and wherein a respective fuselage gantry of the at least two fuselage gantries further comprises:
a nose platform pivotably, slidably, or pivotably and slidably attached to a respective platform of the respective fuselage gantry of the at least two fuselage gantries, wherein the nose platform is configured to engage the rail of the nose gantry, and
wherein the nose platform is moveable between a lowered position and a raised position along the rail of the nose gantry, such that the nose platform provides access to the nose of the aircraft.

10. The aircraft gantry system of claim 2, wherein when the at least two fuselage gantries are adjacently positioned within the plurality of floor tracks, only movement of respective platforms of the at least two fuselage gantries between the lowered position and the raised position along the first rail and the second rail brings the respective platforms into a position directly adjacent to each other.

11. The aircraft gantry system of claim 2, wherein when the at least two fuselage gantries are adjacently positioned within the plurality of floor tracks, respective platforms of the at least two fuselage gantries are always directly adjacent when a vertical position of the respective platforms is the same.

12. The aircraft gantry system of claim 1, wherein the platform is non-extendable away from the first rail and the second rail, such that the first rail and the second rail maintain a distance between the platform and the perimeter of the aircraft.

13. The aircraft gantry system of claim 1, wherein each of the first rail and the second rail include a straight portion and a curved portion, and
wherein a space between the first rail and the second rail is greater in the curved portions thereof than in the straight portions thereof, such that a height of the second rail is greater than a height of the first rail.

14. The aircraft gantry system of claim 13, wherein the curved portions of the first rail and the second rail allow the platform to be moveable between the lowered position and the raised position along the first rail and the second rail in the curved trajectory corresponding to the curvature of the perimeter of the aircraft.

15. The aircraft gantry system of claim 1, wherein when two or more gantries of the plurality of gantries are positioned adjacent each other, a total length of the adjacent platforms of the adjacent gantries equals a total length of the adjacent gantries.

16. The aircraft gantry system of claim 1, wherein the platform is moveably attached to the first and second rails by gears, the gears being on a side of the platform furthest away from the aircraft.

17. The aircraft gantry system of claim 16, wherein the platform extends away from the gears, the first rail, and the second rail toward the aircraft throughout movement between the lowered position and the raised position.

18. The aircraft gantry system of claim 1, wherein the floor of the platform is positioned lower than the first rail and the second rail when the platform is in the raised position.

* * * * *